Feb. 6, 1968   J. GIUSTINO   3,366,987
GRILL AND OVEN SCRAPER AND CLEANER
Filed Jan. 25, 1966
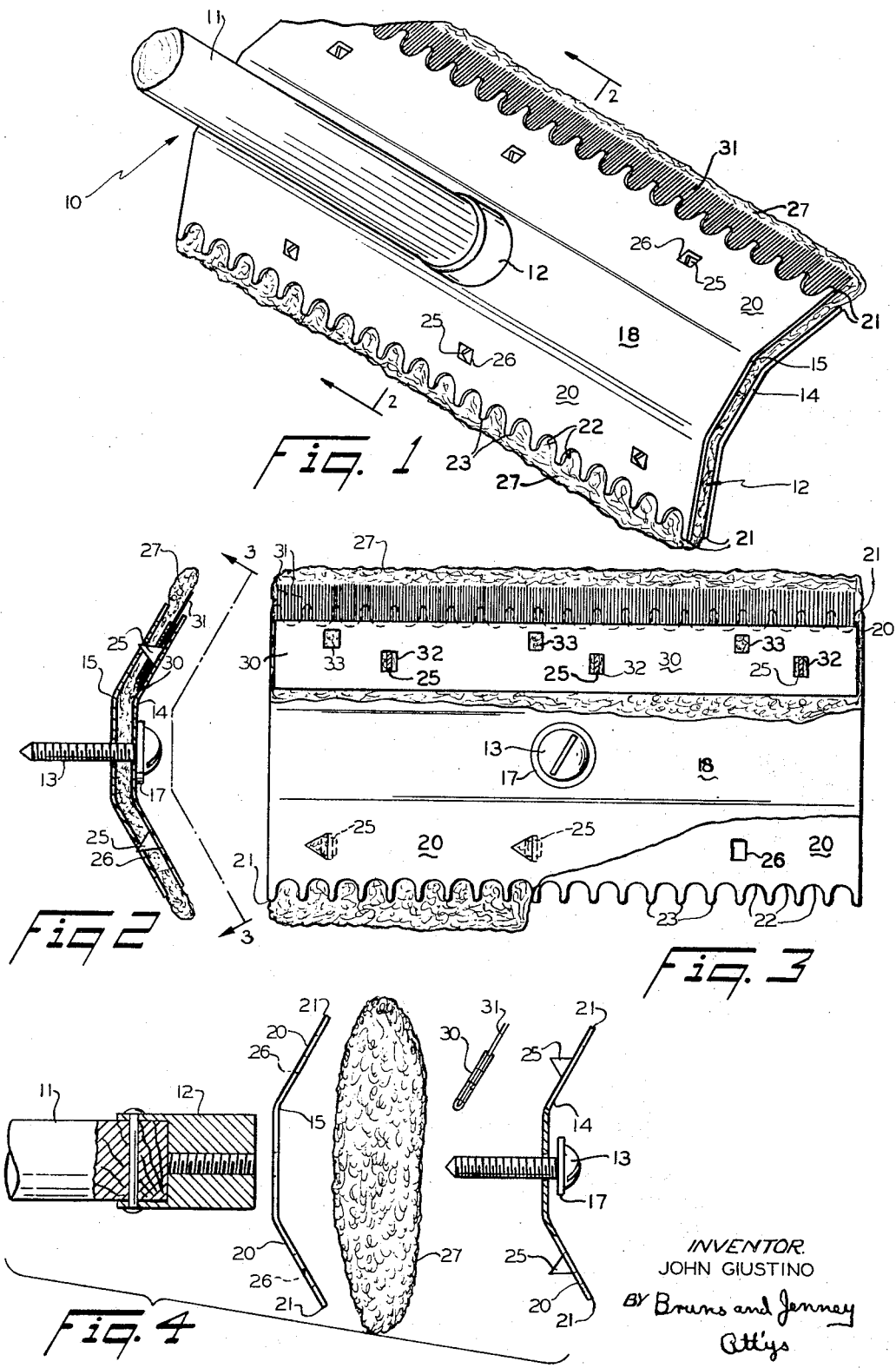
INVENTOR.
JOHN GIUSTINO
BY Bruns and Jenney
Att'ys

United States Patent Office 3,366,987
Patented Feb. 6, 1968

3,366,987
GRILL AND OVEN SCRAPER AND CLEANER
John Giustino, 7685 Gifford Road, Rome, N.Y. 13440
Filed Jan. 25, 1966, Ser. No. 522,881
3 Claims. (Cl. 15—105)

ABSTRACT OF THE DISCLOSURE

The scraper has two rectangular blades with scraping edges angled away from the handle. A pad of steel wool is compressed between the blades by the handle attachment screw, the blades having cooperating tongues and holes to secure the pad in place. A steel brush may also be adjustably secured between a pair of scraping edges with the tongues passing through cooperating holes in the brush. At least one spaced pair of scraping edges are scalloped for scraping the sides of the grill rods.

---

This invention relates to cleaning tools and more particularly to a scraper and cleaner for small outdoor grills and for ovens.

Small outdoor grills are usually removable for cleaning but, since the meats cooked on the grill usually stick to the top of the grill cross-bars and are burned off from the underside of the grill, the principal object of the invention is to provide a tool for quickly and easily scraping and cleaning the top portions of the cross-bars.

Another important object is to provide means for scraping the curved top portions of the cross-bars and also the sides of the cross-bars which may become encrusted.

A further object is to provide a tool which may also be used for cleaning ovens.

Still another object is to provide a scraping tool which has means for scouring and polishing grill cross-bars or oven walls while scraping them.

Other objects and advantages will become apparent from the following description in conjunction with the appended drawings in which:

FIGURE 1 is a fragmentary perspective view of a tool according to the invention;

FIGURE 2 is a sectional view of the tool head on the line 2—2 of FIGURE 1;

FIGURE 3 is a developed view of the head as viewed from the line 3—3 of FIGURE 2, portions being broken away to show the underlying parts; and FIGURE 4 is a fragmentary exploded view partly in section on line 2—2 of FIGURE 1.

Referring to FIGURES 1 and 2, the tool 10 has a handle 11 and a head 12 secured thereto by the screw 13. The head 12 comprises two spaced rectangular metal blades 14 and 15 secured by screw 13 passing through appropriate holes in the center of the blades, the screw being received in a threaded socket in the metal ferrule 16 secured conventionally to the end of the wooden handle 11. A washer 17 may be provided under the head of screw 13.

Blades 14 and 15 are curved, as shown, on either side of a central strip 18 from which the handle 11 projects perpendicularly, to provide flat portions 20 along both long edges 21 of each blade. Portions 20 project at an angle from the ferruled end of handle 11 so that when an operator grasps the handle one portion 20 of each blade is adapted to project perpendicular to the surface being worked upon.

The long edges 21 of blades 14 and 15 are scalloped as shown to provide curved edge portions 22 adapted to embrace the top portions of grill cross-bars and intervening round-pointed portions 23 lying along a straight line so as to be adapted to scrape flat surfaces such as the walls of an oven.

Blade 14 is provided with three struck-out pointed tongues 25 aligned as shown along each flat portion 20. The tongues project toward blade 15. Blade 15 is provided with three holes 26 along each flat portion 20 in registry with the tongues 25 when the head is assembled. The tongues 25 are disposed in planes perpendicular to the long edges 21 of the blade 14, as shown.

A pad 27 of steel wool is disposed between the blades 14 and 15, as shown, the blades being of such width that the pad 27 extends out substantially beyond the edges 21 of the blades when the pad is compressed between the blades. The tongues 25 are pointed so as to easily penetrate the steel wool and are of such length as to enter holes 26 of blade 15. Screw 13 is also pointed so as to penetrate the steel wool when assembling the head to the handle. When the screw 13 is tightened in ferrule 11 the pad 27 is firmly compressed between the blades 14 and 15.

Between one flat portion 20 of blade 14 and pad 17, a thin brush 30 with wire bristles 31 is secured. The brush 30 is provided with a first series of three aligned rectangular holes 32 in registry with and through which the tongues 25 extend from the adjacent portion 20 of blade 14. The tongues 25 are aligned parallel to the adjacent long edge 21 of blade 14 and the bristles 31 extend substantially past this edge 21.

Tongues 25 and holes 32 are equally spaced and spaced from one end of blade 14 so that the center tongue and hole is offset from the center line across the blade. Spaced closer to the ends of bristles 31 is another series of three aligned rectangular holes 33. These holes are spaced so that when the brush is turned over end-for-end they are in registry with the tongues 25 and when the tongues extend through the holes 33 the ends of the bristles 31 are aligned with the rounded points 23 of the adjacent long edge 21 of the blade.

In operation, when the tool is assembled tongues 25 help to secure the pad 17 in place, hold the brush 30 in place, and keep the blades 14 and 15 inter-engaged. With the brush bristles 31 projecting beyond the adjacent long edge 21, round-barred grills may be scraped and scoured clean by rubbing the tool with the brush side down back and forth along the grill bars. The bristles 31 extend down and are deflected aside by each bar to scrape alongside each bar and, when the tool is forced down against the bars, the curved edge portions 22 scrape the top of the bars. At the same time the portions of the steel wool pad extending beyond the edges 21 of the blades scour the tops of the bars removing rust as well as adhered waste.

When cleaning ovens, either the side of the tool with the brush or the brushless side may be used. The toolhead is dipped in any suitable oven-cleaner fluid and is rubbed along the walls of the oven. The round-pointed portions 23 of edge 21 may be used to scrape the wall or the brush bristles 31 may be used. Simultaneously the steel wool scours.

Alternatively, the tool may be assembled with bristles 31 extending only to the edge 21. The ends of the bristles extend past the curved edge portions 22 and clean the tops of the grill bars when a grill is cleaned and scraped, and the rounded points 23 along with the bristles 31 scrape flat surfaces when an oven wall is cleaned.

As will be apparent to those familiar with the art, the invention may be embodied in other specific forms without departing from the spirit or essential characteristics thereof. The embodiment disclosed therefore is to be considered in all respects as illustrative rather than restrictive, the scope of the invention being indicated by the appended claims.

What is claimed is:

1. A tool for scraping a grill which has a plurality of equally spaced parallel bars, comprising: a pair of generally rectangular scraper blade members adapted to be secured together in spaced relation; a pad of steel wool compressed between the blades, the pad extending substantially beyond the long edges of the blades; a handle extending perpendicularly from the center of one of the blades; and screw means removably securing the blades to the handle and clamping the pad between the blades; each blade being curved intermediate its long edges and having a flat portion along each long edge disposed to project at a substantial angle from the handle end, one blade having a plurality of pointed tongues struck from the flat portions thereof projecting toward the other blade and piercing through the pad, the other blade having mating holes therethrough in registry with the tongues and through which the pointed ends of the tongue project, at least one long blade edge of one blade and the long blade edge of the other blade spaced alongside thereof being scalloped to form thereon a plurality of grill-scraping curved edge portions and intervening rounded point portions aligned along a straight line for scraping flat oven surfaces.

2. The tool as defined in claim 1 characterized by having said tongues equally spaced along lines spaced from and parallel to each of the long edges of the tongue-bearing blade; and further including a thin wire brush between the pad and one of the flat portions of the tongue bearing blade, the brush having a series of aligned spaced holes therethrough in registry with the tongues on said one flat portion, the tongues extending through the holes in the brush for securing the brush in place, the brush having steel bristles projecting substantially past the adjacent long edge.

3. The tool as defined in claim 2 further including a second series of aligned spaced holes through the brush, said second series of holes being in registry with said tongues when the brush is removed and turned end-for-end, the second series being spaced a lesser distance from the bristle ends, whereby the brush is secured with its bristles extending substantially to the aligned rounded point portions of the scalloped-edged blade.

References Cited

UNITED STATES PATENTS

| 1,586,439 | 5/1926 | Bennington | 15—245 |
| 1,917,490 | 7/1933 | Bookman | 15—210 |
| 2,807,814 | 10/1957 | Leeming | 15—111 |
| 2,824,323 | 2/1958 | Tos et al. | 15—111 X |

CHARLES A. WILLMUTH, *Primary Examiner.*

L. G. MACHLIN, *Assistant Examiner.*